United States Patent
Fu et al.

(10) Patent No.: US 10,331,676 B2
(45) Date of Patent: Jun. 25, 2019

(54) SYSTEM AND METHOD OF VOCABULARY-INFORMED CATEGORIZATION OF ITEMS OF INTEREST INCLUDED WITHIN DIGITAL INFORMATION

(71) Applicant: DISNEY ENTERPRISES, INC., Burbank, CA (US)

(72) Inventors: Yanwei Fu, Burbank, CA (US); Leonid Sigal, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 537 days.

(21) Appl. No.: 15/098,214

(22) Filed: Apr. 13, 2016

(65) Prior Publication Data
US 2017/0300534 A1    Oct. 19, 2017

(51) Int. Cl.
| | | |
|---|---|---|
| *G06F 16/00* | (2019.01) | |
| *G06F 16/2457* | (2019.01) | |
| *G06F 17/27* | (2006.01) | |
| *G06N 20/00* | (2019.01) | |
| *G06F 16/29* | (2019.01) | |
| *G06F 16/683* | (2019.01) | |
| *G06F 16/23* | (2019.01) | |
| *G06F 16/583* | (2019.01) | |
| *G06F 16/783* | (2019.01) | |
| *G06F 16/953* | (2019.01) | |
| *G06F 16/38* | (2019.01) | |
| *G06F 16/36* | (2019.01) | |

(52) U.S. Cl.
CPC .... *G06F 16/24575* (2019.01); *G06F 16/2379* (2019.01); *G06F 16/29* (2019.01); *G06F 16/367* (2019.01); *G06F 16/38* (2019.01); *G06F 16/5846* (2019.01); *G06F 16/683* (2019.01); *G06F 16/7844* (2019.01); *G06F 16/953* (2019.01); *G06F 17/2785* (2013.01); *G06N 20/00* (2019.01)

(58) Field of Classification Search
CPC ......... G06F 17/30253; G06F 17/30743; G06F 17/30796
See application file for complete search history.

(56) References Cited

U.S. PATENT DOCUMENTS

| | | | | |
|---|---|---|---|---|
| 2012/0023103 A1* | 1/2012 | Soderberg | ......... | G06F 17/30265 707/739 |
| 2014/0146053 A1* | 5/2014 | Cragun | ............. | G06F 17/30247 345/467 |

* cited by examiner

*Primary Examiner* — Grace Park
(74) *Attorney, Agent, or Firm* — Esplin & Associates, PC

(57) ABSTRACT

Items of interest within digital information may be detected and associated with a label that provides context to the item of interest. The label may describe an item category of the item of interest. The knowledge base of item categories may be limited. Additional item categories may be learned by accessing sets of vocabulary that may relate to the known item categories.

18 Claims, 3 Drawing Sheets

SYSTEM AND METHOD OF VOCABULARY-INFORMED CATEGORIZATION OF ITEMS OF INTEREST INCLUDED WITHIN DIGITAL INFORMATION

FIELD OF THE DISCLOSURE

This disclosure relates to vocabulary-informed categorization of items of interest included within digital information.

BACKGROUND

Machine learning techniques may be used to identify and/or contextually categorize items of interest depicted in digital media content and/or other digital information. For example, digital media content may comprise digital images. Items of interest may comprise objects detected in the images. Some techniques may include one-shot learning, zero-shot learning, open set recognition, visual-semantic embedding, and other techniques. One-shot learning techniques may be configured to learn object categories from one, or only few examples. The examples may be referred to as "training data." To compensate for the lack of training data and to enable one-shot learning, knowledge may be obtained from other sources, for example, by similarity of features, semantic attributes, and/or other information. Zero-shot learning may be configured to recognize novel categories of detected object with no training data by obtaining knowledge from auxiliary categories. For example, zero-shot learning may explore the use of attribute-based semantic representations. An attribute vector prototype of each category must be pre-defined which may be very computationally expensive for a large-scale dataset. In some instances, semantic word vectors may be used to embed a given class name without human efforts; they can therefore serve as an alternative semantic representation. Open set recognition may identifying whether an image belongs to seen or un-seen categories. However, open set recognition may not be able to identify the descriptions of the un-seen categories. Visual-Semantic embedding may provide a mapping between visual features and semantic entities. The mapping may be directly learned by one or more of regressing visual features to the semantic space using one or more of Support Vector Regressors (SVR), neural network, and/or other techniques; projecting visual features and semantic entities into a common new space such as SJE, WSABIE, ALE, DeViSE, CCA, and/or other techniques; and/or by other methods. However, one or more techniques may be limited by the information with which they may be conditioned on.

SUMMARY

One aspect of the disclosure relates to a system configured for vocabulary-informed categorization of items of interest included within digital media content and/or other digital information. Digital media content may include one or more of digital images, digital audio, digital video, and/or other digital media assets. Other digital information may include one or more of motion information, position information, and/or other information. By way of non-limiting example, motion information and/or position information may be include output signals generated one or more sensors and/or information conveyed by the output signals. The one or more sensors may include one or more of an accelerometer, GPS, and/or other sensors.

One or more implementations of system 100 herein may be configured to associate labels with individual items of interest. The labels may include information that may provide context to the items of interest. By way of non-limiting example, a label may describe a item category of an item of interest.

An individual item category may be associated with one or more categorical descriptions of items of interest. A categorical description may include a description of one or more features of items of interest that may be classified under one or more corresponding item categories.

One or more additional (e.g., new) item categories may be determined from sets of vocabulary that may relate to the known item categories. Based on the additional item categories, classification of items of interest under item categories may be improved and/or the associations of items of interest with labels may be updated to reflect the additional item categories.

In some implementations, the system may include one or more physical processors configured by machine-readable instructions. Executing the machine-readable instructions may cause the one or more physical processors to facilitate vocabulary-informed categorization of items of interest included within digital media content and/or other digital information. The machine-readable instructions may include one or more of a categorization component, a vocabulary learning component, an association component, and/or other components.

The categorization component may be configured to store categorization information and/or other information. Categorization information may include associations of a set of labels with a set of items of interest included in a set of instances of digital media content. Individual labels may describe an item category of individual items of interest.

The vocabulary learning component may be configured to determine additional item categories. The additional item categories may be determined based on vocabulary that may be related to the item categories described by the set of labels associated with the categorization information. In some implementations, determining the additional item categories may comprise one or more of: accessing a text corpus; identifying individual sets of vocabulary included in the text corpus that relate to individual item categories described by the set of labels; defining the additional item categories based on the sets of vocabulary; and/or other operations. In some implementations, determining the additional item categories may be based on one or more item category specifications. An item category specification may include sets of vocabulary that may define and/or otherwise specify attributes of item of interest within an item category. By way of non-limiting example, an item category specification may comprise one or more of ontology of a given category, a specification of values of attributes of items of interest within an item category, a hierarchical structure over an item category, and/or other information.

The association component may be configured to update associations within the categorization information. By way of non-limiting example, associations of one or more of the labels included the set of labels with one or more of the items of interest within the set of items of interest may be updated to include associations with one or more other labels that describe one or more of the additional item categories. The updated associations may be stored within the categorization information.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
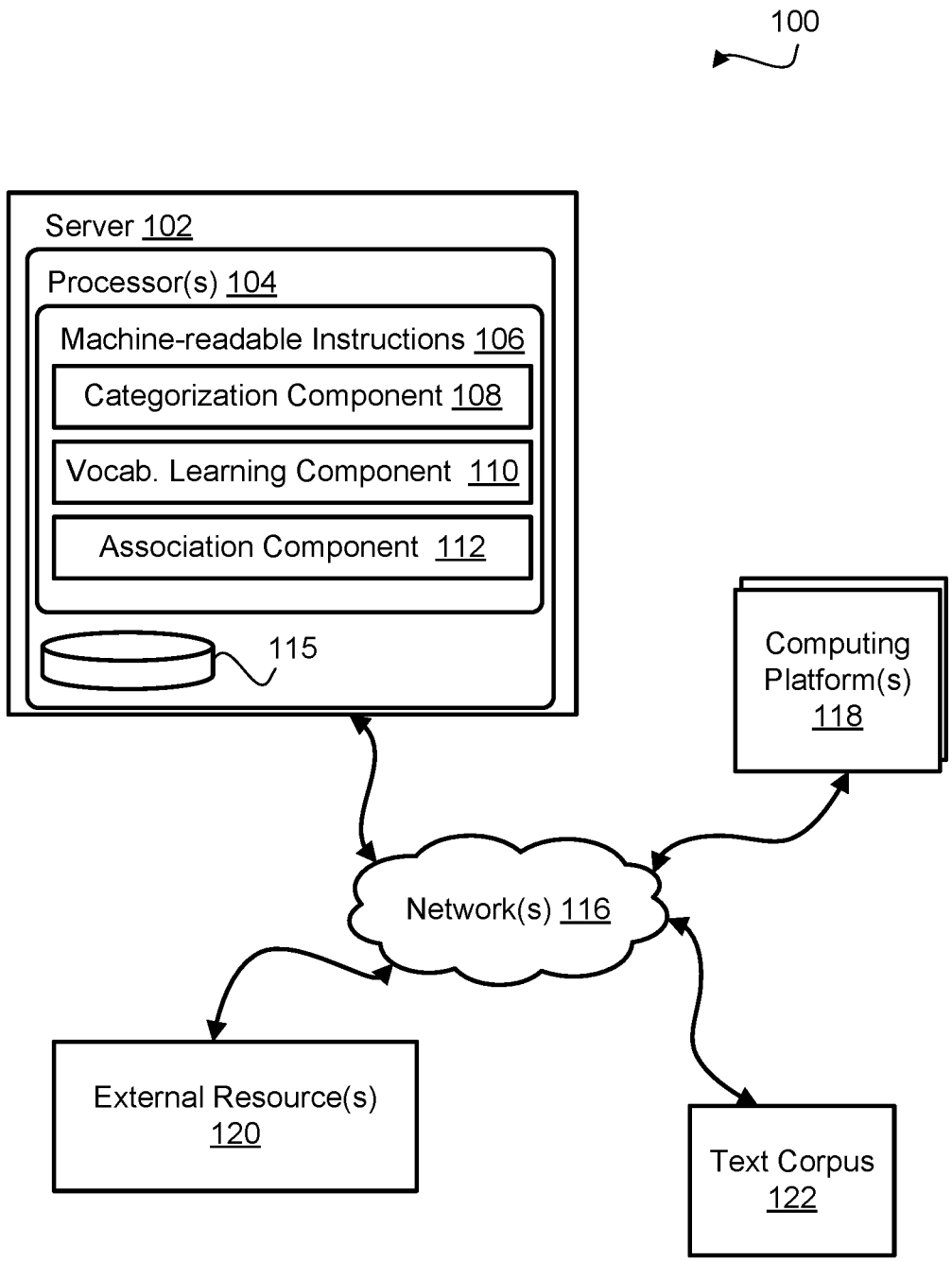
FIG. 1 illustrates a system configured for vocabulary-informed categorization of items of interest included within digital media content and/or other digital information, in accordance with one or more implementations.

FIG. 1 illustrates a system 100 configured for facilitating vocabulary-informed categorization of items of interest included within digital media content and/or other digital information, in accordance with one or more implementations. Digital media content may include one or more of digital images, digital audio, digital video, and/or other digital media assets. Other digital information may include one or more of motion information, position information, and/or other information. By way of non-limiting example, motion information and/or position information may include information conveyed by output signals of one or more sensors. The one or more sensors may include one or more of an accelerometer, GPS, and/or other sensors.

One or more implementations of system 100 herein may be configured to provide labels for individual items of interest in order to provide context to the items of interest. A label may describe a item category of an item of interest and/or other information. An individual item category may be associated with one or more categorical descriptions of items of interest. A categorical description may include information conveying one or more features of items of interest that may classify the items of interest under a given item category.

In some implementations, the system 100 may comprise one or more of a server 102, one or more computing platforms 118, one or more external resources 120, and/or other components. The server 102 may include one or more physical processors 104 configured by machine-readable instructions 106. Executing the machine-readable instructions 106 may cause the one or more physical processors 104 to facilitate categorization of items of interest included within digital media content. The machine-readable instructions 106 may include one or more of a categorization component 108, a vocabulary learning component 110 (abbreviated as "Vocab. Learning Component 110" in FIG. 1), an association component 112, and/or other components.

In some implementations, the server 102 may be configured to provide remote hosting of the features and/or function of the machine-readable instructions 106 to one or more computing platforms 118 that may be remotely located from the server 102. However, in some implementations, one or more features and/or functions of server 102 may be attributed as local features and/or functions of one or more computing platforms 118. By way of non-limiting example, individual ones of the computing platforms 118 may include machine-readable instructions comprising the same or similar components as machine-readable instructions 106 of server 102. The computing platforms 118 may be configured to locally execute the one or more components that may be the same or similar to the machine-readable instructions 106.

The computing platforms 118 may include one or more of a cellular telephone, a smartphone, a digital camera, a laptop, a tablet computer, a desktop computer, a television set-top box, smart TV, a gaming console, and/or other platforms.

In some implementations, the categorization component 108 may be configured to store categorization information and/or other information. Categorization information may include one or more of item categories of items of interest, associations of one or more sets of labels with one or more sets of items of interest included in one or more sets of instances of digital media content and/or other digital information. Individual items of interest may be classified under one or more item categories. A label associated with an item of interest may describe an item category of an item of interest, and/or other information. A label may include one or more of a word, a phrase, a sentence, and/or other information that may describe an item category. By way of non-limiting example, a label may comprise a name of an item category, and/or other information.

Item categories may be association with categorical descriptions. Categorical description that may describe sets of one or more features and/or attributes of items of interest that fall within corresponding ones of the item categories.

Individual items of interest may correspond to content-specific phenomena occurring in instances of digital media content and/or other digital information. In some implementations, content-specific phenomena may be detectable within digital media content and/or other digital information based on one or more detection techniques.

By way of non-limiting example, a first instance of digital media content and/or other digital information may include a first item of interest and/or other items of interest. The first item of interest may have a first set of features and/or other features. The first set of features may fall within a first categorical description and/or other categorical descriptions of items of interest. The first categorical description may be associated with a first item category and/or other item categories. The first item of interest may be classified under the first item category and/or other item categories. The first item of interest may be associated with a first label and/or other labels. The first label may describe the first item category and/or other item categories.

In some implementations, content-specific phenomena within digital images and/or other digital media content may comprise one or more of feature points, objects, continuous curves, regions, and/or other phenomena that may be detected within digital images. Feature points, objects, continuous curves, regions, and/or other phenomena may be distinguishable based on features of the corresponding phenomena. Features may include one or more of shape, form, location, orientation, color, size, and/or other features.

In some implementations, an item of interest within a digital image may include a detected first object, and/or other content-specific phenomena within digital images. The first object may have a first set of features and/or other features. The first set of features of the first object may include one or more of a first form, a first shape, a first size, a first color, and/or other detected features. The first categorical description may include a description of objects having one or more of the first form, first shape, first size, first color, and/or other information. The first set of features may fall within the first categorical description. The first categorical description may be associated with the first item category and/or other item categories. The first object may be classified under the first item category. The first object may be associated with the first label. For example, the first label may describe one or more of the first form, first shape, first size, first color, and/or other information that may describe the first item category.

By way of non-limiting illustration, the first object may comprise a depiction of a mountain bike and/or other objects within the digital image. The first set of features may include one or more of "two in-line round objects" (e.g., tires), "an elongated object positioned above one of the round objects" (e.g., handlebar), and/or other features. The first item category may be "a bicycle," and/or other item category. The first categorical description may include a description of "bicycles having two in-line tires, a handlebar positioned above one of the two tires, and/or other features," and/or other information. The first object may be classified under the item category of "a bicycle," and/or associated with a label of "a bicycle."

It is noted that the above "bicycle" example is provided for illustrative purposes only and is not to be considered limiting. For example, one or more of the techniques for detecting items of interest, classifying items of interest under one or more item categories, and/or associating item of interests with labels may be carried out for other items of interest within other types of digital media content.

In some implementations, content-specific phenomena within digital audio may comprise one or more of digital signal segments, Mel-frequency cepstrum (MFC) features, and/or other phenomena that may be detected within digital audio. In some implementations, a signal segment within digital audio may correspond to one or more of a word, a phrase, a sentence, a sound, a sound effect, and/or other information. By way of non-limiting example, an item of interest within digital audio may include a detected first signal segment, and/or other content-specific phenomena within digital audio.

In some implementations, content-specific phenomena within digital video may comprise one or more of objects, regions, actions, scenes, sounds, and/or other phenomena that may be detected within digital video. By way of non-limiting example, an item of interest within a digital video may include a detected first object, a detected first action, a detected first scene, a detected first sound, and/or other content-specific phenomena within digital video.

In some implementations, content-specific phenomena within motion information may comprise one or more of a detected change in sensor output, one or more threshold values of sensor output, and/or other phenomena. In some implementations, content-specific phenomena within motion information may be related to a certain type of motion being conveyed by the sensor output. Types of motion may include one or more of changes in acceleration, changes in orientation, and/or other motion. By way of non-limiting example, a change in sensor output generated by a sensor may convey a change in motion experienced by the sensor and/or a body on which the sensor may be fixed. For example, the sensor may be an accelerometer and a change in sensor output generated by the accelerometer may convey a change in acceleration experienced by the accelerometer and/or a body on which the accelerometer may be fixed. In some implementations, an item of interest within motion information may include one or more of the motion conveyed by the change in sensor output (e.g., an abrupt change in acceleration, and/or other motion), and/or other phenomena within motion information.

In some implementations, content-specific phenomena within position information may comprise one or more of a detected change in sensor output, one or more threshold values of sensor output, and/or other phenomena. In some implementations, content-specific phenomena within position information may be related to certain geo-graphical location conveyed by the sensor output, changes in location conveyed by the sensor output, a duration a certain geographical location may be conveyed by the sensor output, and/or other phenomena. By way of non-limiting example, a change in sensor output generated by a sensor may convey a change in geographic positioning of the sensor and/or a body on which the sensor may be fixed. For example, the sensor may be a GPS sensor and a change in sensor output generated by the GPS may convey a change from one geographic location to another. In some implementations, an item of interest within position information may include one or more of a location conveyed by GPS output, a change in location conveyed by the GPS output and/or other phenomena within position information.

In some implementations, information included in the categorization information may include pre-determined and/or learned information. For example, one or more item categories and/or associations between a set of items of interest and a set of labels may be determined from a training data set. The training data set may comprise an exemplary set of instance of digital media content and/or other digital information having a set of identified items of interest. The set of items of interest within the training data may be classified under known item categories. Such training data set may be populated by techniques including one or more of manual associations by a user, zero-shot learning, one-shot learning, open set recognition, visual-semantic embedding, and/or other techniques.

In some implementations, the training data set may facilitate one or more of classifying items of interest detected in non-training data digital media content under one or more of the known item categories, associating the items of interest with labels that may describe these known item categories, and/or other operations. By way of non-limiting example, items of interest may be classified as an item category based on features of the items of interest being the same or similar as one or more known features of classified items of interest within the training data set.

By way of non-limiting illustration, a training data set may include a first association of a first item of interest and/or other items of interest with a first label and/or other labels. The first item of interest may be of a first item category and/or other item categories. The first item of interest may be associated with a first set of features and/or other features. A second item of interest and/or other items of interest may be detected in an instance of digital media content. The second item of interest may be detected to have the first set of features and/or other features. Based on the training data, the second item of interest may be classified under the first item category and/or other item categories. The second item of interest may be associated with a second label and/or other labels. The second label may be the same or similar as the first label.

By way of further non-limiting illustration, the training data set may include an association of one or more objects detected within digital images with a label describing an item category of "bicycle." The one or more objects may have features of "two in-line round objects," "an elongated object positioned above one of the round objects," and/or other features that may be associated with the item category of "bicycle" (e.g., the two round objects representing tires, the elongated object represented handlebars, and/or other features representing features of a bicycle). Other objects that may share the same or similar features as those in the training data set may be detected within other digital images. The other objects sharing these features may also be classified under the "bicycle" item category and/or may be associated with labels that describe the item category of "bicycle."

It is noted that although the above exemplary illustration is directed to items of interest within digital images, the this is not to be considered limiting. For example, in other implementations, one or both of classification of items of interest under known item categories and/or association of the items of interest with labels based on training data may be similarly accomplished for digital audio, video, and/or other types of digital media content.

By way of further non-limiting illustration, a training data set may include an association of particular sensor output included in motion information with a label describing an item category of "inverted rotation." The sensor output may be generated by an accelerometer and/or other sensor. The sensor output may convey changes in acceleration that may be indicative of the accelerometer and/or a body on which the accelerometer may be fixed performing an "inverted rotation." By way of non-limiting illustration, an accelerometer may be worn or carried by a user. The user may be performing a "backflip" such that the sensor output generated by the accelerometer may have certain features that may convey the flipping rotation of the accelerometer and/or user. Other sensor output from other sensors that may share the same or similar features as those in the training data set may be detected within other motion information and categorized accordingly. It is noted that the above description of sensor output having features that may be indicative of "inverted rotation" is provided for illustrative purposes only. For example, training data may have other sensor output that may be used to classify the output as indicating other types of motion categories.

In some implementations, a training data set may be limited to a set of known item categories. Use of the training data set to associate other items of interest with labels may be limited to other items of interest that may also be classified under the item categories known to the training data. Further, it may become apparent that one or more associations made during training may be incorrect and/or inaccurate due to the limited information at training. By way of non-limiting example, one or more detected items of interest may have been inadvertently classified under an inaccurate item category and/or one or more items of interest may be associated with an inaccurate label. Following the above "bicycle" examples, limitations may be manifested in that an object that may in fact be a unicycle or tricycle may be inaccurately classified as "bicycle" and/or inaccurately associated with a "bicycle" label. Following the above "inverted rotation" example, limitations may be manifested in that sensor output that may in fact be conveying a non-inverted spinning rotation motion may be inaccurately classified as "inverted rotation."

In some implementations, it may be desired to expand the knowledge base of item categories. By expanding the knowledge base of item categories, items of interest that may have been specifically known training (e.g., having specific descriptions thereof) may now be properly classified under one or more newly learned item categories and/or associated with labels that describe the one or more newly learned item types. Associations within the training data may be updated to reflect more accurate item categories.

It is noted that one or more descriptions of features of system 100 presented herein directed to digital media content is not intended to be limiting. Instead, it should be appreciated that the same or similar features may be utilized in implementations involving other digital information.

The vocabulary learning component 110 may be configured to define one or more additional (e.g., new) item categories and/or other information. The one or more additional item categories may be defined based on vocabulary and/or other information that may be related to the item categories already known by the categorization information. Defining one or more additional item categories may comprise determining one or more additional (e.g., new) categorical descriptions of items of interest from the related vocabulary, and/or other operations. The one or more additional categorical descriptions may define one or more features of items of interest previously not having specific classification within the training data. The newly specified items of interest within the one or more additional categorical descriptions may facilitate defining one or more additional item categories. One or more items of interest that share the features defined in the one or more additional categorical descriptions may be classified corresponding ones of the one or more additional item categories.

In some implementations, related vocabulary of interest may comprise one or more of a word, a phrase, and/or a sentence that may be one or more of contextually related to known item categories, synonymous with known item categories, and/or related to known item categories in other ways.

In some implementations, the vocabulary learning component 110 may be configured such that identifying sets of related vocabulary may comprise one or more of accessing a text corpus 122, utilizing one or more item category specifications, and/or other operations.

In some implementations, text corpus 122 may comprise one or more of a digital text source, and/or other sources. A digital text source may comprise one or more of an electronic document, a web page, a text-based database, a blog, a discussion board, and/or other sources. By way of non-limiting example, a text corpus may comprise a set of WIKIPEDIA articles and/or other sources. In some implementations, vocabulary learning component 110 may be configured to access a text corpus through communications established over network(s) 116 and/or by other techniques. For example, vocabulary component 110 may be configured to access a text corpus 122 over the Internet and/or other networks.

In some implementations, identifying sets of vocabulary related to individual ones of the known item categories within a text corpus may comprise identifying one or more of the words, phrases, and/or sentences that describe the known item categories, and/or other operations. Identifying sets of vocabulary related to individual ones of the known item categories may comprise identifying text appearing with and/or surrounding the identified words, phrases, and/or sentences within the text corpus that describe the known item categories, and/or other operations. Contextually similar, synonymous, and/or other information related to the identified words, phrases, and/or sentences that describe the known item categories may be determined from the text.

By way of non-limiting example, a set of related vocabulary may comprise words (e.g., nouns, adjectives, and/or other words), phrases, and/or sentences that appear in the context of the identified words, phrases, and/or sentences that describe known item categories.

By way of non-limiting illustration, the vocabulary learning component 110 may be configured to access text corpus 122 and/or perform other operations. The vocabulary learning component 110 may be configured to identify individual sets of vocabulary included in the text corpus that relate to individual item categories described by a set of labels known in training data (e.g., stored by categorization component 108) and/or perform other operations. By way of non-limiting example, a first set of vocabulary may be identified. The first set of vocabulary may relate to a first item category described in training data. In some implementations, identifying the first set of vocabulary may comprise identifying a second set of vocabulary within the text corpus that describes the first item category. The first set of vocabulary may be identified based on text that may appear with and/or surround the second set of vocabulary.

In some implementations, determining the additional item categories may be based on one or more item category specifications. An item category specification may include sets of vocabulary that may define and/or otherwise specify attributes of item of interest within an item category, and/or may specify other information. By way of non-limiting example, an item category specification may comprise one or more of ontology of a given category, a specification of values of attributes of items of interest within an item category, and/or other information.

In some implementations, an ontology of a given category may comprise definitions of ontological relationships between words, and/or other information. In some implementations, an ontology of a given item category may describe a hierarchical structure of words related to the item category. By way of non-limiting example, an ontological relationship may include, for example: "perennial" is a "plant," and "plant" is an "organism"; "truck" is a kind of "motor vehicle"; "square" is a type of "rectangle"; and/or other information.

The vocabulary learning component 110 may be configured to define additional item categories based on the individual sets of vocabulary. By way of non-limiting example, a second item category may be defined based on the first set of vocabulary. Defining the second item category may comprise determining a categorical description of the second item category from the first set of vocabulary and/or other information. The categorical description may be determined based on identifying one or more features of one or more items interest that may fall within the second item category from the first set of vocabulary, and/or other information determined from the first set of vocabulary.

By way of non-limiting illustration, following the above "bicycle" item category example, a text corpus comprising a bicycle blog may be accessed. The word "bicycle" may be identified within the blog. A set of vocabulary related to the word "bicycle" may be identified. By way of non-limiting example, the set of vocabulary may include one or more of words, phrases, and/or sentences that may appear with and/or surround occurrences of the word "bicycle." For example, it may be determined that the blog further comprise discussion of "tricycles," their construction, their differences between bicycles and/or other vehicles, and/or other information. By way of non-limiting example, the set of vocabulary may include one or more of the word "tricycle"; that a tricycle has "three wheels" wherein "two wheels are positioned side-by-side," "a single wheel is positioned in front of the two wheels," "a handle bar is positioned above the single wheel"; and/or other information that may be determined from the blog. A categorical description of a new "tricycles" item category may be determined from the set of vocabulary. By way of non-limiting example, the categorical description of the new item category of "tricycle" may describe features of tricycles being one or more of "three round objects," wherein "two round objects are positioned side-by-side," "a single round object is positioned in front of the two round objects," "an elongated object is positioned above the single round object," and/or other features.

It is noted that the above "tricycle" example is provided for illustrative purposes only and is not to be considered limiting. For example, one or more of the above describe techniques may be employed for other digital media content and/or other types of items of interest.

Figure 3:
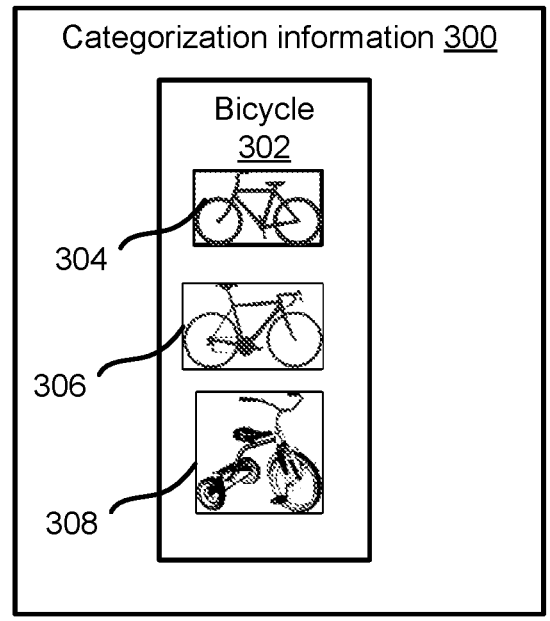
FIG. 3 illustrates an graphical representation of categorization information including classifications of items of interest with digital media content and/or other digital information under one or more item categories.

FIG. 3 illustrates an exemplary graphical representation of categorization information 300 stored by categorization component 108 (FIG. 1). For illustrative purposes, FIG. 3 is directed to digital image type digital media content that includes one or more digital images depicting one or more objects. Categorization information 300 may represent information known at training time. By way of non-limiting example, categorization information may include one or more item categories, such as a bicycle item category 302. The categorization information 300 at training may include one or more images 304, 306 and/or 308 that may be classified under the bicycle category 302 and/or associated with corresponding labels that describe the bicycle category 302.

Figure 4:
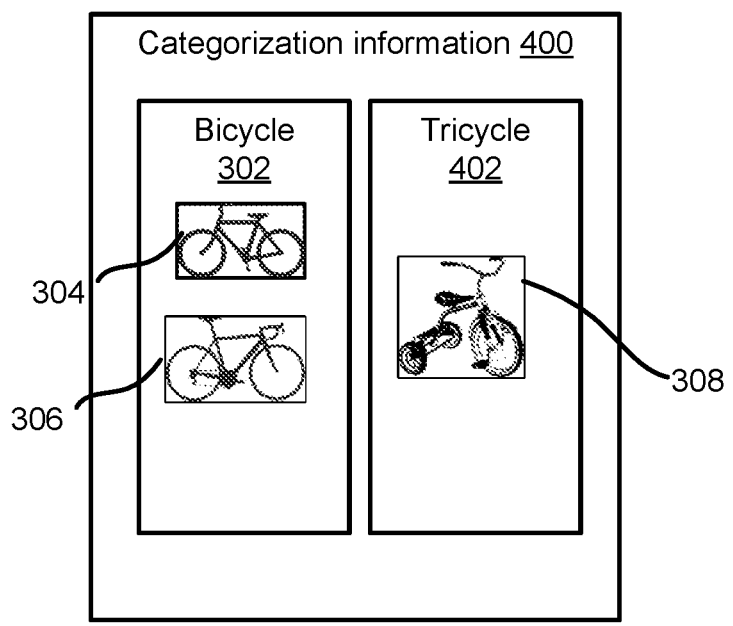
FIG. 4 illustrates an graphical representation of updated categorization information including classifications of items of interest with digital media content and/or other digital information under one or more item categories.

As described herein, information at training time may be limited. The limited information may be manifested in an image of a tricycle 308 being inaccurately classified under the bicycle category 302. Access and analysis of a text corpus (not shown in FIG. 3) may facilitate determining one or more additional item categories to update the categorization information 300. FIG. 4 illustrates an exemplary graphical representation of updated categorization information 400. For example, a new tricycle item category 402 may be learned from the text corpus. This may be visually represented within the updated categorization information 400 by the image of the tricycle 308 being classified into the tricycle item category 402 and/or a label describing the image of the tricycle 308 as a "bicycle" being replaced with a label describing the image of the tricycle 308 as a "tricycle."

Returning to FIG. 1, in some implementations, one or more operations of vocabulary learning component 110 and/or other components of system 100 may be initiated based on user input via a computing platform(s) 118, and/or by other techniques. By way of non-limiting example, a computing platform(s) 118 may be configured to effectuate presentation of a user interface. The user interface may be configured to obtain user input related to initiation one or more operations of one or more components of machine-readable instructions 106.

In some implementations, the association component 112 may be configured to associate labels with items of interest that describe one or more of additional item categories learned by the vocabulary learning component 110. In some implementations, associating labels with items of interest that describe one or more of the additional item categories may comprise updating associations included in the training data (e.g., included in the categorization information stored by categorization component 108).

In some implementations, updating associations included in the categorization information may comprise identifying items of interest known to the training data that may have one or more features that may match one or more features of items of interest described in one or more additional categorical descriptions associated with the one or more additional item categories. Responsive to a match being determined, it may be determined that the identified one or more items of interest may have been inaccurately classified under an item category at training (e.g., due to lack of information known at training time). Classification may be updated by classifying the one or more identified items of interest under one or more of the additional item categories based on the matching of one or more features. Based on the updated classification under a new item category, the one or more items of interest may be associated with one or more updated labels describing the new item category. The categorization component 108 may be configured to store the additional item categories, categorical descriptions, and/or updated associations within the categorization information.

By way of non-limiting example, the categorization information may include an association of a first item of interest with a first label. The first label may describe a first item category of the first item of interest. The vocabulary learning component 110 may define a second item category previously unspecified within the categorization information based on one or more techniques described herein. The second item category may be associated with a categorical description that includes a first set of features of items of interest that fall within the second item category. The association component 112 may be configured to match the first item of interest with the first set of features. The association component 112 may be configured to associate the first item of interest with a second label. The second label may describe the second item category. The association with the second label may replace the association with the first label. The updated associations may be stored within the categorization information (e.g., facilitated by categorization component 108).

In some implementations, label associations may be represented in a semantic embedding space. In particular, classification under item categories may be done through nearest-neighbor distance between labels describing the item categories represented in the semantic embedding space. A set of constraints may be imposed to ensure that labeled items of interest within exemplar digital media content project into the semantic space such that the labeled items of interest project at or near the correct item categories represented in the space. In some implementations, word embedding (e.g., distributed vector representation such as word2vec and/or other similar algorithms) may be used to initialize the semantic space at training time. Once new item categories are learned, the semantic space may be tuned to account for the new information. For example, the semantic space may be tuned by minimizing Euclidian distance between labels within the space such that individual ones of the labeled items of interest may end up closer together within the correct (and newly learned) item category(ies) represented in the semantic space than to incorrect ones, and/or by other techniques.

In FIG. 1, the server 102, computing platforms 118, and/or external resources 120 may be operatively linked via one or more electronic communication links. For example, such electronic communication links may be established, at least in part, via network(s) 116 such as the Internet and/or other networks. It will be appreciated that this is not intended to be limiting and that the scope of this disclosure includes implementations in which server 102, computing platforms 118, and/or external resources 120 may be operatively linked via some other communication media.

The external resources 120 may include sources of information, hosts, external entities participating with system 100, and/or other resources. In some implementations, some or all of the functionality attributed herein to external resources 120 may be provided by resources included in system 100.

The server 102 may include electronic storage 115, one or more processors 104, and/or other components. The server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 115 may comprise electronic storage media that electronically stores information. The electronic storage media of electronic storage 115 may include one or both of system storage that is provided integrally (i.e., substantially non-removable) with server 102 and/or removable storage that is removably connectable to server 102 via, for example, a port or a drive. A port may include a USB port, a firewire port, and/or other port. A drive may include a disk drive and/or other drive. Electronic storage 115 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 115 may include one or more virtual storage resources (e.g., cloud storage, a virtual private network, and/or other virtual storage resources). Electronic storage 115 may store software algorithms, information determined by processor(s) 104, information received from server 102, information received from computing platform(s) 118, and/or other information that enables server 102 to function as described herein.

Processor(s) 104 may be configured to provide information-processing capabilities in server 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108, 110, and/or 112. Processor(s) 104 may be configured to execute components 108, 110, and/or 112 by software; hardware; firmware; some combination of software, hardware, and/or firmware; and/or other mechanisms for configuring processing capabilities on processor(s) 104.

It should be appreciated that although components 108, 110, and/or 112 are illustrated in FIG. 1 as being co-located within a single processing unit, in implementations in which processor(s) 104 includes multiple processing units, one or more of components 108, 110, and/or 112 may be located remotely from the other components. The description of the functionality provided by the different components 108, 110, and/or 112 described above is for illustrative purposes and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, 112, and/or other components. As another example, processor(s) 104 may be configured to execute one or more additional components that may perform some or all of the functionality attributed below to one of components 108, 110, and/or 112.

Figure 2:
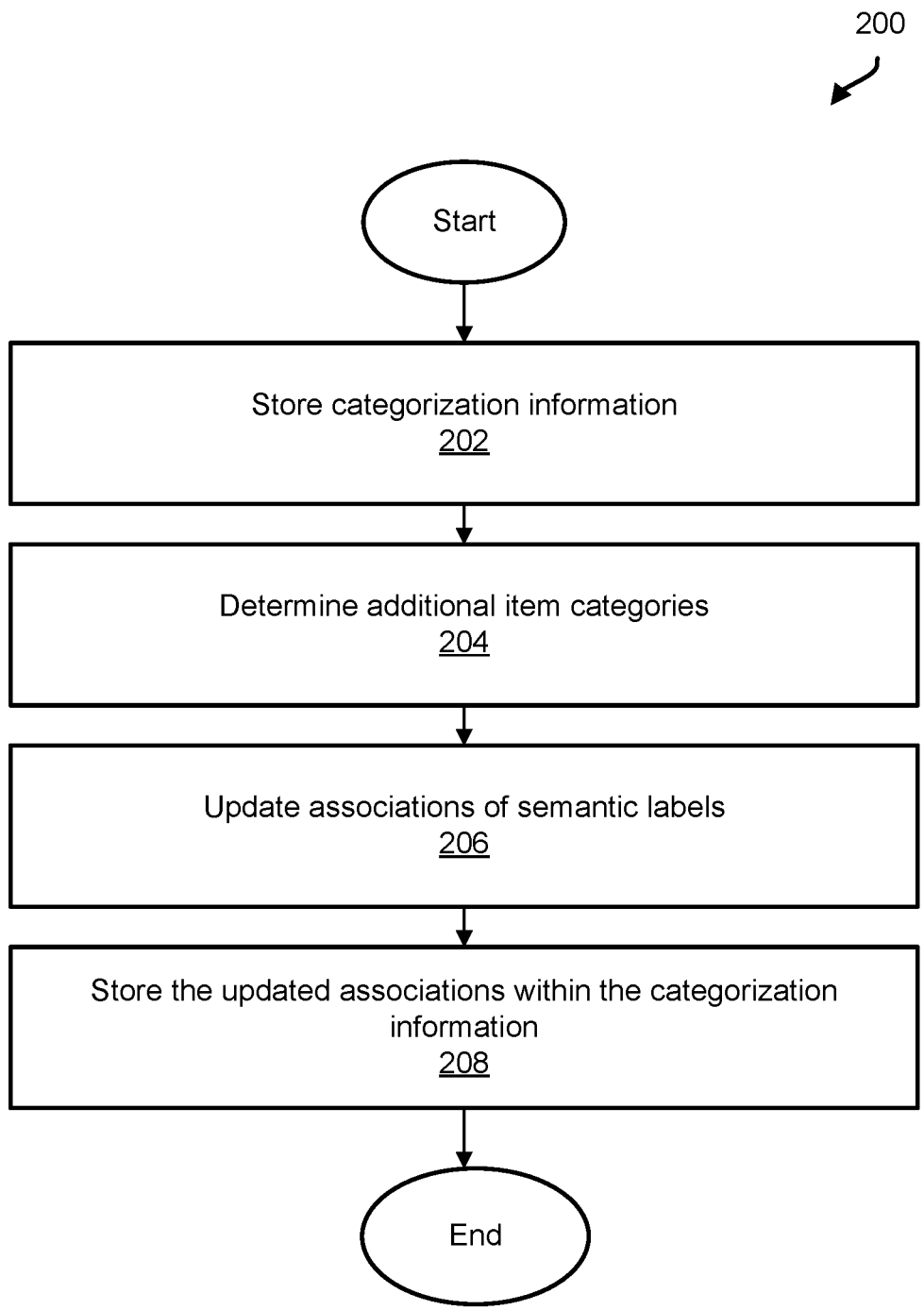
FIG. 2 illustrates a method of vocabulary-informed categorization of items of interest included within digital media content and/or other digital information, in accordance with one or more implementations.

FIG. 2 illustrates a method 200 of vocabulary-informed categorization of items of interest included within digital media content. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in a computer system comprising one or more processing devices (e.g., physical processor, a digital processor, an analog processor, a digital circuit designed to process information, an analog circuit designed to process information, a state machine, and/or other mechanisms for electronically processing information), storage medium storing machine-readable instructions, and/or other components. The one or more processing devices may include one or more devices executing some or all of the operations of method 200 in response to instructions stored electronically on electronic storage medium. The one or more processing devices may include one or more devices configured through hardware, firmware, and/or software to be specifically designed for execution of one or more of the operations of method 200.

At an operation 202, categorization information and/or other information may be stored. Categorization information may include associations of one or more sets of semantic labels with one or more sets of items of interest included in one or more sets of instances of digital media content. Individual semantic labels may describe an item category of individual items of interest. In some implementations, operation 202 may be performed by one or more physical processors executing a categorization component the same as or similar to categorization component 108 (shown in FIG. 1 and described herein).

At an operation 204, additional item categories may be determined. The additional item categories may be determined based on vocabulary that may be related to the item categories described by the one or more sets of semantic labels within the categorization information. In some implementations, operation 204 may be performed by one or more physical processors executing a vocabulary learning component the same as or similar to vocabulary learning component 110 (shown in FIG. 1 and described herein).

At an operation 206, associations of one or more of the semantic labels may be updated. By way of non-limiting example, associations of one or more semantic labels included in the one or more sets of semantic labels with one or more of the items of interest within the one or more sets of items of interest may be updated with associations with one or more other semantic labels that describe one or more of the additional item categories. In some implementations, operation 206 may be performed by one or more physical processors executing an association component the same as or similar to association component 112 (shown in FIG. 1 and described herein).

At an operation 208, updated associations may be stored within the categorization information. In some implementations, operation 208 may be performed by one or more physical processors executing a categorization component the same as or similar to categorization component 108 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for vocabulary-informed categorization of items of interest included within digital information, the system comprising:
   one or more physical processors configured by machine-readable instructions to:
      store categorization information that includes associations of a set of semantic labels with a set of items of interest included in a set of instances of digital information, individual semantic labels describing individual item categories of individual items of interest;
      determine additional item categories, the additional item categories being determined based on vocabulary that is related to the item categories described by the set of semantic labels;
      update associations of one or more of the semantic labels included the set of semantic labels with one or more of the items of interest within the set of items of interest with one or more other semantic labels that describe one or more of the additional item categories; and
      store the updated associations within the categorization information;
   wherein determining the additional item categories comprises:
      accessing a web document comprising text;
      searching the text within the web document, and identifying phrases and/or sentences which include descriptions of the individual item categories included in the categorization information;
      identifying, within the text, a set of vocabulary including contextually similar vocabulary and/or synonymous vocabulary related to the phrases and/or sentences; and defining the additional item categories based on the set of vocabulary.

2. The system of claim 1, wherein an instance of digital information comprises one or more of a digital image, digital audio, digital video, motion information, or position information.

3. The system of claim 2, wherein an individual item of interest corresponds to content-specific phenomena occurring in an instance of digital information.

4. The system of claim 3, wherein content-specific phenomena occurring in a digital image comprise objects detected in the digital image.

5. The system of claim 1, wherein a first item category is associated with a first categorical description, wherein the first categorical description describes a first set of features of items of interest that fall within the first item category.

6. The system of claim 5, wherein defining the additional item categories based on the set of vocabulary comprises:
    determining a second categorical description from the set of vocabulary related to the first item category, the second categorical description describing a second set of features of items of interest that fall within a second item category; and
    defining the second item category based on the second categorical description.

7. The system of claim 6, wherein updating associations of one or more of the semantic labels with items of interest that describe the first item category with other semantic labels that describe the second item category comprises:
    identifying one or more items of interest that have features that match the second set of features; and
    associating the identified one or more items of interest with other semantic labels that describe the second item category.

8. The system of claim 7, wherein associating the identified one or more items of interest with other semantic labels that describe the second item category comprises replacing associations of the identified items of interest with semantic labels that describe the first item category.

9. The system of claim 1, wherein the contextually similar vocabulary comprises one or more of a word, a phrase, or a sentence that corresponds to a context of the individual item categories.

10. A method of vocabulary-informed categorization of items of interest included within digital information, the method being implemented in a computer system comprising one or more physical processors and storage medium storing machine-readable instructions, the method comprising:
    storing categorization information that includes associations of a set of semantic labels with a set of items of interest included in a set of instances of digital information, individual semantic labels describing individual item categories of individual items of interest;
    determining additional item categories, the additional item categories being determined based on vocabulary that is related to the item categories described by the set of semantic labels;
    updating associations of one or more of the semantic labels included the set of semantic labels with one or more of the items of interest within the set of items of interest with one or more other semantic labels that describe one or more of the additional item categories; and
    storing the updated associations within the categorization information;
    wherein determining the additional item categories comprises:
        accessing a web document comprising text;
        searching the text within the web document, and identifying phrases and/or sentences which include descriptions of the individual item categories included in the categorization information;
        identifying, within the text, a set of vocabulary including contextually similar vocabulary and/or synonymous vocabulary related to the phrases and/or sentences; and
        defining the additional item categories based on the set of vocabulary.

11. The method of claim 10, wherein an instance of digital information comprises one or more of a digital image, digital audio, digital video, motion information, or position information.

12. The method of claim 11, wherein an individual item of interest corresponds to content-specific phenomena occurring in an instance of digital information.

13. The method of claim 12, wherein content-specific phenomena occurring in a digital image comprise objects detected in the digital image.

14. The method of claim 10, wherein a first item category is associated with a first categorical description, wherein the first categorical description describes a first set of features of items of interest that fall within the first item category.

15. The method of claim 14, wherein defining the additional item categories based on the set of vocabulary comprises:
    determining a second categorical description from the set of vocabulary related to the first item category, the second categorical description describing a second set of features of items of interest that fall within a second item category; and
    defining the second item category based on the second categorical description.

16. The method of claim 15, wherein updating associations of one or more of the semantic labels with items of interest that describe the first item category with other semantic labels that describe the second item category comprises:
    identifying one or more items of interest that have features that match the second set of features; and
    associating the identified one or more items of interest with other semantic labels that describe the second item category.

17. The method of claim 16, wherein associating the identified one or more items of interest with other semantic labels that describe the second item category comprises replacing associations of the identified items of interest with semantic labels that describe the first item category.

18. The method of claim 10, wherein the contextually similar vocabulary comprises one or more of a word, a phrase, or a sentence that corresponds to a context of the individual item categories.

* * * * *